United States Patent
Baumgartner et al.

(10) Patent No.: US 6,659,688 B2
(45) Date of Patent: Dec. 9, 2003

(54) ORGANIC SLURRY BASIN STORAGE COVER AND METHOD OF FABRICATING AND DEPLOYING COVER

(75) Inventors: John W. Baumgartner, Olivia, MN (US); Mark K. Kubesh, Olivia, MN (US)

(73) Assignee: Baumgartner Environics, Inc., Olivia, MN (US)

( * ) Notice: Subject to any disclaimer, the term of this patent is extended or adjusted under 35 U.S.C. 154(b) by 0 days.

(21) Appl. No.: 10/224,857

(22) Filed: Aug. 20, 2002

(65) Prior Publication Data

US 2002/0192031 A1 Dec. 19, 2002

Related U.S. Application Data

(63) Continuation-in-part of application No. 09/774,842, filed on Jan. 31, 2001, now abandoned.
(60) Provisional application No. 60/179,919, filed on Feb. 3, 2000.

(51) Int. Cl.$^7$ .............................. E04H 4/08; E04H 4/10; B65D 88/36; B65D 88/40; B09B 5/00
(52) U.S. Cl. .............................. 405/129; 4/498; 4/503; 210/170; 52/741.4; 220/218; 220/220
(58) Field of Search .................. 405/129.9, 129.95, 405/129.45, 129.1, 129.75; 4/498, 503, 502, 501; 210/150, 151, 170; 135/115, 119; 52/741.4; 220/216–220, 315, 324, 375

(56) References Cited

U.S. PATENT DOCUMENTS

| | | | |
|---|---|---|---|
| 2,952,024 A | 9/1960 | Bartolucci | 4/503 |
| 3,683,428 A | 8/1972 | Morris | 4/498 |
| 3,862,876 A | 1/1975 | Graves | 428/83 |
| 4,135,257 A | 1/1979 | Lof | 4/498 |
| 4,192,025 A | 3/1980 | Hinsperger | 4/498 |
| 4,672,691 A | 6/1987 | De Garie et al. | 4/499 |
| 4,969,500 A | 11/1990 | Makosa | 160/135 |

(List continued on next page.)

OTHER PUBLICATIONS

Jacobsen, et. al. University of Minnesota, College of Agricultural, Food, and Environmental Sciences; Generic Environmental Impact Statement on Animal Agriculture: A Summary of the Literature Related to Air Quality and Odor (H); Sep. 1999—7 pages.

Department of Biosystems and Agricultural Engineering, University of Minnesota, 1996 Annual Report—Research: Waste Management—Evaluation of Experimental Swine Waste Storage Covers for Odor Control—2 pages.

(List continued on next page.)

*Primary Examiner*—Thomas B. Will
*Assistant Examiner*—Tara L. Mayo
(74) *Attorney, Agent, or Firm*—Robert W. Gutenkauf; Gray, Plant, Mooty, Mooty & Bennett, PA (57) ABSTRACT

A cover assembly for an organic waste lagoon basin and a method of making and deploying such a cover assembly. A cover includes connected cover panels or sections. In one form of the invention the panels are comprised of a single layer of geotextile fabric. In another form of the invention the panels are comprised of interconnected strata including a sacrificial layer which faces the sun and protects the cover from ultraviolet light degradation; a foam layer that floats the cover; and a geotextile fabric layer. The geotextile fabric is porous and suppresses the release of malodorous gases from the lagoon basin. The cover can be constructed and deployed by laying out cover panels in fanfold fashion along a side of the basin; connecting adjacent edges of the panels; attaching flotation to the free edge of the top panel; and using deployment lines and a mandrel to move the cover across the filled basin.

23 Claims, 7 Drawing Sheets

U.S. PATENT DOCUMENTS

| | | |
|---|---|---|
| 4,971,217 A | 11/1990 | Robertson et al. ........... 220/218 |
| 5,049,265 A | 9/1991 | Boyd et al. .................. 210/150 |
| 5,067,182 A | 11/1991 | Koelsch ......................... 4/498 |
| 5,096,577 A | 3/1992 | Ngo et al. ................... 210/151 |
| 5,150,510 A | 9/1992 | Moreland ..................... 52/414 |
| 5,265,976 A | 11/1993 | Russell ......................... 405/52 |
| 5,400,549 A | 3/1995 | Morgan ......................... 52/23 |
| 5,524,302 A | 6/1996 | Ragsdale et al. ............... 4/502 |
| 5,593,575 A | 1/1997 | Cretini ....................... 210/170 |
| 5,861,095 A | 1/1999 | Vogel et al. ................. 210/605 |
| 6,071,418 A | 6/2000 | Tai .............................. 210/760 |
| 6,136,194 A | 10/2000 | Vogel et al. ................. 210/605 |
| 6,161,235 A | 12/2000 | Smith et al. .................. 5/504.1 |
| 2002/0139742 A1 | 10/2002 | Svirklys et al. ............. 210/603 |

OTHER PUBLICATIONS

Department of Biosystems and Agricultural Engineering, University of Minnesota, 1997 Annual Report—Manure/Odor Management—Experimental Manure Storage Covers for Odor Control—2 pages.

Department of Biosystems and Agricultural Engineering, University of Minnesota, Final Report Dec. 31, 1997: Evaluation of Various Swine Waste Storage Covers for Odor Control —4 pages.

Product Description: Mirafi Filterweave Woven Geotextiles for Erosion Control and Filtration, undated.

Case Study: Embankment/Sludge Lagoon (1997/1998), Columbus, Ohoi, FW402 and HP1500, undated.

ORGANIC SLURRY BASIN STORAGE COVER AND METHOD OF FABRICATING AND DEPLOYING COVER

CROSS REFERENCE TO RELATED APPLICATION

This application is a continuation-in-part of U.S. application Ser. No. 09/774,842 filed Jan. 31, 2001, now abandoned, which application claims the benefit of U.S. provisional application 60/179,919 filed Feb. 3, 2000.

BACKGROUND OF THE INVENTION

Malodorous emissions from open organic slurry storage structures are a nuisance for nearby receptors. Large scale livestock facilities and subsequent malodorous gas emissions therefrom have become a source of national controversy.

Many methods have been tried to control malodorous emissions on open organic slurry storage basins: impervious covers with and without gas collection systems, bioaugmentation, chemical additives, enzymes and full and partial aerobic treatment systems. Impervious cover systems are quite costly and gas collection systems require significant initial capital investment as well as ongoing maintenance expense. Bioaugmentation, chemical additives and enzymes have not delivered consistent odor control and usually require significant ongoing labor and maintenance costs in addition to product costs. Aerobic methods work most convincingly, but excessive cost has prevented widespread acceptance of aeration as the preferred method of odor control. Floating biomats of straw provide partial aeration, have performed well and are reasonably economical. But it is difficult to place and maintain a solid straw cover on areas greater than two hundred feet wide. They also require regular maintenance to cover an increasing slurry storage surface area as sloped earthen basins fill, and to fill holes that appear as straw sinks to the bottom of the basin. Crossover piping and recycle pumps and plumbing have been clogged with sunken straw, potentially compromising basin capacity and requiring additional manpower to periodically unclog problem appurtenances. Sinking straw also increases organic loading in the basin, potentially compromising design storage capacity.

SUMMARY OF THE INVENTION

The invention relates to a cover system for an organic waste storage lagoon, as well as a method for construction of a cover and a method of deploying it over an at least partially filled organic waste storage lagoon. A cover is fabricated from a geotextile material that can be a polypropylene fiber, non-woven, needle punched fabric stabilized to resist degradation due to ultraviolet light exposure. The cover can be constructed from a plurality of panels of geotextile material that are connected edgewise as they are laid out in fanfold fashion along an edge of a lagoon basin. The cover system can include deployment ropes attached to the cover having a length sufficient to span the basin and engage a pulley system to pull the cover across the surface of material in the basin. Tether lines are attached to the cover and are connectable to anchoring structure along side the basin in order to secure the floating cover in place on the surface of material contained in the lagoon basin. The cover is effective to reduce malodorous gas emissions by 60% to 90%. The cover fabric is porous and it restricts the release of gas to a volume regulated by this porosity. Vapor pressure under the cover causes small areas of the cover to inflate and rise from the surface of the organic slurry in a low profile manner which creates a humid, aerobic environment along the unsubmerged surface of the cover. The anaerobic zone on the underside of the cover provides a substrate to which anaerobic bacteria attach and break down malodorous gases passing through the cover to the atmosphere.

An embodiment of the cover system includes a multiple strata cover. A top stratum is a sacrificial layer to shield the lower strata from ultraviolet light damage due to sun exposure. Lower strata include a non-woven, geotextile fabric layer and a flotation foam layer. The foam layer is comprised of foam strips that can either be placed on the bottom or sandwiched between the other two strata. The three strata are needle-punched together, using fiber stands from both the non-woven and sacrificial strata to bind all strata together.

DESCRIPTION OF PREFERRED EMBODIMENTS

A lagoon basin cover system according to the invention has a cover that is fabricated on site from geotextile material which is typically a polypropylene fiber, nonwoven, needle punched fabric that is stabilized to resist degradation due to ultraviolet light exposure. This is typically a felt-like material that has a specific gravity less than 1 and, therefore, floats like a sponge on water. It can stretch half of its original length, has a grab tensile strength of 200 lbs. or more, weighs 8 oz/yd or more, has an apparent opening size equal to a 100 U.S. Sieve, and has a permitivity of 1.5 gal./min./ft$^2$/sec or less. Stock rolls of geotextile material are fabricated into a single cover approximately the size of the top inside dimensions of the open storage structure.

A basin to be covered is evaluated to select the most efficient side of the basin upon which to build the cover. A berm is selected which will preferably be along the longest edge if the basin is a rectangle, the longest edge adjacent to the right angle if the basin is a right triangle, along the hypotenuse if an obtuse triangle, along either long edge of an isosceles triangle, and along the longest edge of a polygon. A circular or oblong basin cover will be fabricated parallel to the longest distance across the surface area of the basin.

A cover is constructed by successively laying out panels of geotextile material or fabric and fastening adjacent edges. A first panel of geotextile fabric is rolled out along the berm selected for fabrication. A second panel of geotextile is rolled out on top of the first. The fabric is laid out in fanfold fashion. One edge of the under panel of geotextile is rolled back to overlap the edge of the next panel by approximately three inches. A seaming process described below can be employed to join the two panels of geotextile fabric together. Another panel of geotextile is then rolled out on top of the top panel of seamed geotextile. The unseamed edge of the panel of geotextile under the top panel is rolled back to overlap the top panel of geotextile by approximately three inches. This process will continue until the last panel of geotextile necessary to cover the inside top surface area dimensions of the basin has been seamed to make a one-piece cover. Individual geotextile panel lengths are cut to the length necessary and/or are shifted along the length of the panel beneath it to create the desired shape coverage of surface area.

Figures 1, 1A:
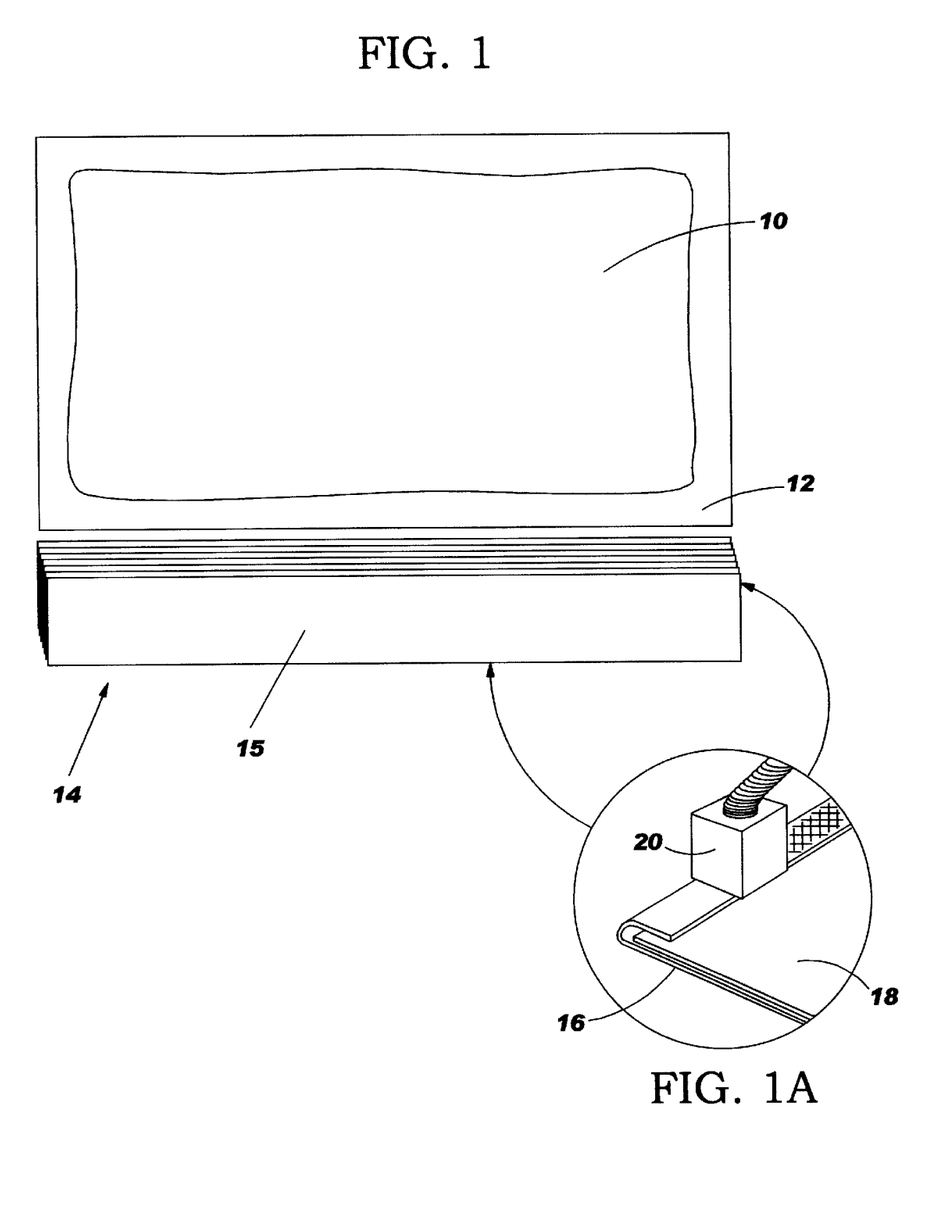
FIG. 1 is a top plan view of a cover system of the invention in an early stage of deployment of a cover over a lagoon basin.
FIG. 1A is an enlarged view in perspective of a portion of the cover of FIG. 1 showing a heat seaming tool in use to connect adjacent panels of the cover of FIG. 1.

Referring to FIG. 1, there is shown a lagoon basin 10 in top plan view that is generally rectangular in shape. A cover 14 has a cover base 15 that has been constructed on site along a long berm 12. Cover 14 is constructed of multiple interconnected panels of geotextile fabric of the type described above. The panels are assembled in fanfold relationship as shown in FIG. 2.

FIG. 1A shows the interconnection of two adjacent panels 16, 18 of cover 14. The edge of the lower panel 16 is overlapped the edge of the upper panel 18. A heat seaming device 20 is used to connect adjacent edges. Seaming is best accomplished using heat to fuse overlapping seams together, but may also be accomplished with a sewing machine using an ultraviolet light inhibiting thread, indicated at 17 in FIG. 1A.

Figure 2:
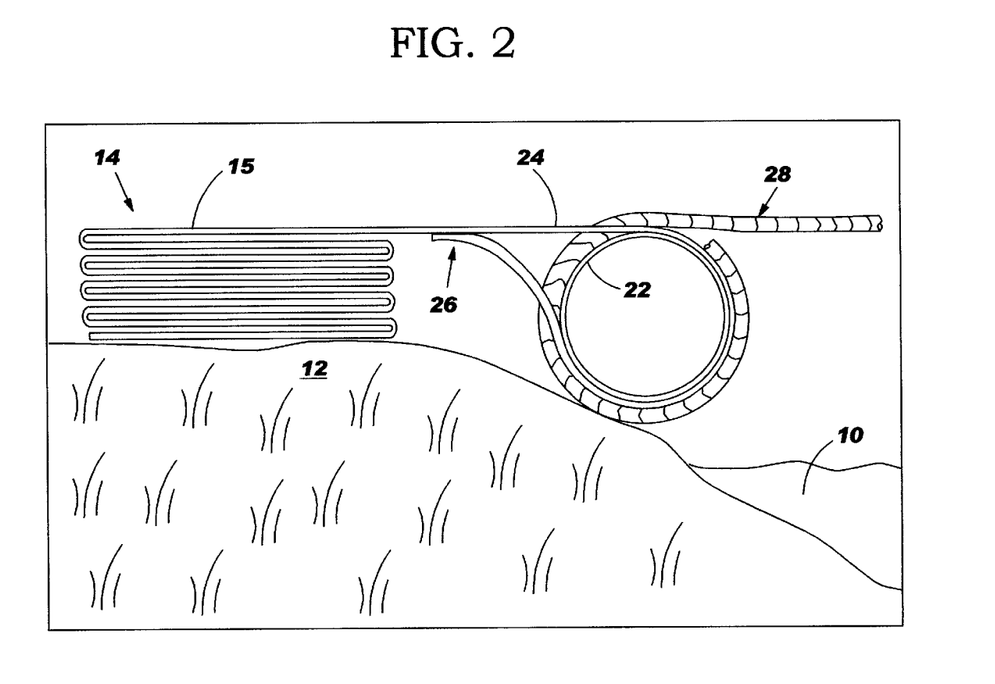
FIG. 2 is a side view of a portion of the cover of FIG. 1 at a later stage of deployment.

As shown in FIG. 2, the unseamed edge of the last or top panel of the cover is wrapped around floatation and tacked together using a hot air gun to lightly fuse the adjoined geotextile material together. This is done to create a leading edge that will float over the surface of material located in the basin as the cover is pulled into position across the basin. Deployment ropes or lines are attached to the floating leading edge of the cover. These deployment lines are stretched across the basin to the opposite berm. FIG. 2 shows a float tube 22 connected to the top or leading edge 24 of the cover 14. The leading edge 24 is wrapped around the float tube 22 and secured at spot weld points 26. A plurality of deployment lines 28 are connected at one end to the leading edge 24 as by being connected to float tube 22.

Figure 3:
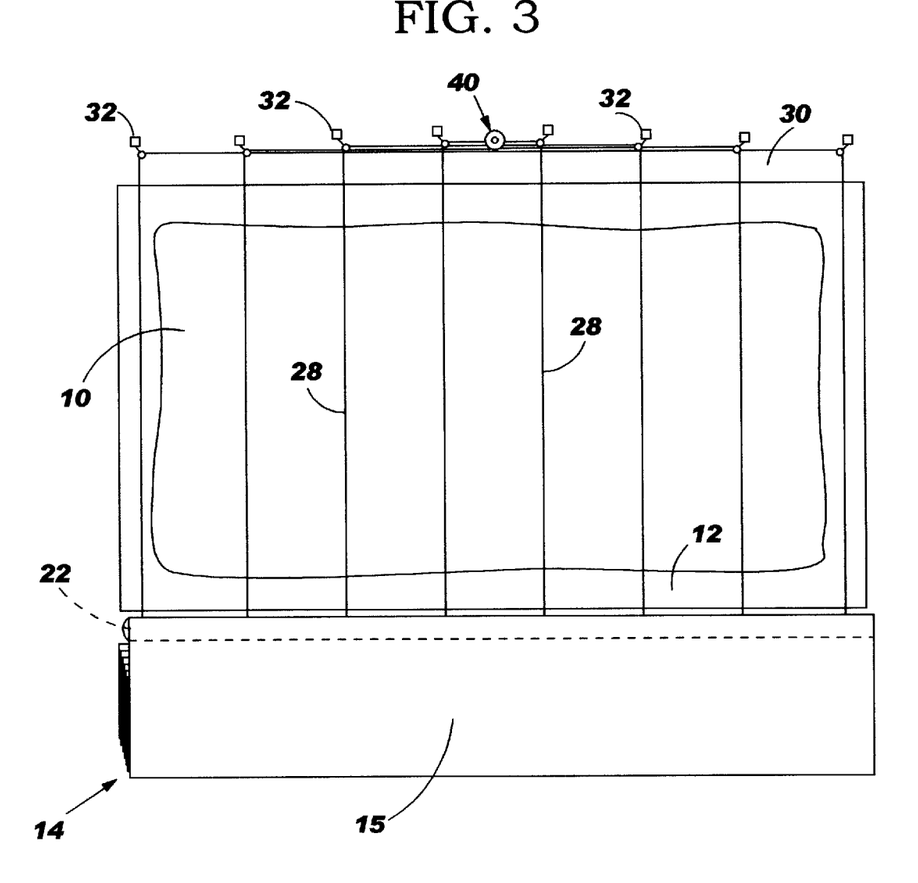
FIG. 3 is a top plan view of the cover of FIGS. 1 and 2 at a later stage of deployment.
Figure 3A:
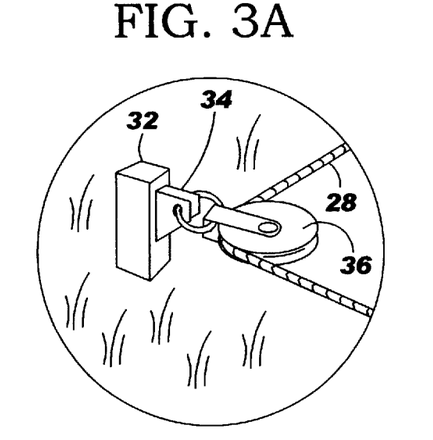
FIG. 3A is an enlarged side view of a portion of the deployment mechanism of the cover of FIG. 3.

FIG. 3 shows deployment lines 28 spanning the basin 10 to the opposite berm 30 preparatory to deployment of cover 14 across the lagoon. As shown in FIG. 3A, posts 32 with flange plates are pressed into the middle of the top flat area of the berm 30. The posts 32 are approximately equal-distant to each other. Each post has an attached pulley 36 connected to a mounting plate 34. Posts 32 are aligned with attachment points of the deployment lines 28 to the float tube 22. The deployment lines 28 are threaded through pulleys 36 and trained to a central point where a single mandrel 40 is located. The cover is deployed using the single segmented mandrel 40 to which the deployment lines 28 are attached. The mandrel is rotated to wind the deployment lines onto the mandrel. This pulls the cover base 15 squarely across the basin as the fan-folded cover on the berm unfolds to cover the surface area.

Figure 4:
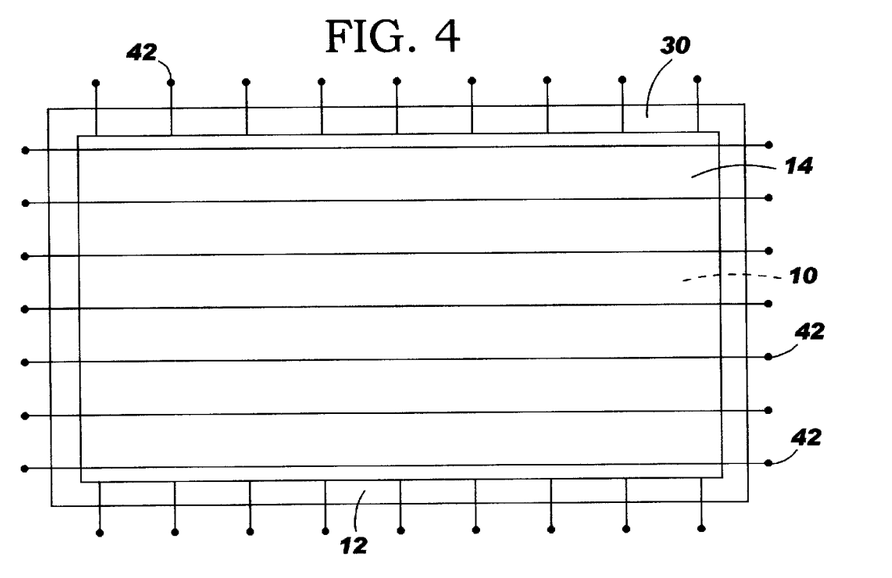
FIG. 4 a top plan view of the cover of FIGS. 1 and 3 fully deployed.
Figure 4A:
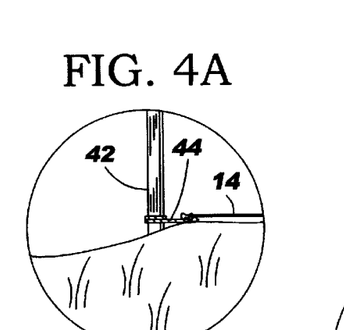
FIG. 4A is an enlarged side view of a portion of the cover of FIG. 4 showing a connection of the cover to an anchor post.
Figure 4B:
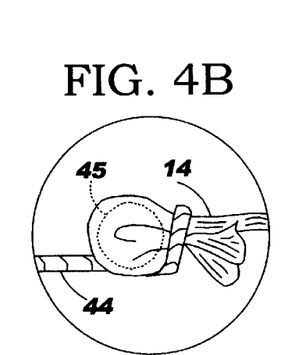
FIG. 4B is a view of a portion of the cover shown in FIG. 4A enlarged to show the connection of a tether to the cover.
Figure 4C:
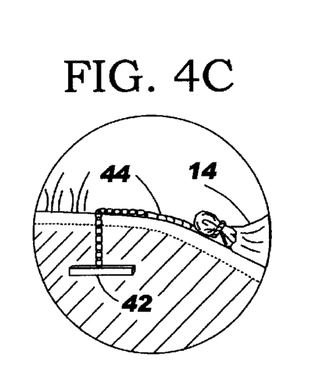
FIG. 4C is a view like that of FIG. 4A showing an alternative means of anchoring the cover.

FIG. 4 shows the cover of the invention installed on the lagoon basin. Anchors 42 are installed around the perimeter of the basin. Tethers 44 connect the anchors to the cover. A typical spacing between anchors can be twenty to thirty feet. The anchors can be traditional steel fence posts as shown in FIG. 4A, set back from the berm so as not to impair the integrity of a compacted clay liner. As shown in FIGS. 4 and 4A, tether 44 extends from the cover 14 to an anchor 42. The tether 44 is connected to the cover in such a fashion as not to puncture the geotextile material. An edge section of the cover 14 is wrapped around a ball 45 (FIG. 4B) to provide a neck to tie the tether 44. Another form of anchor comprised as a ground anchor is shown in FIG. 4C, having a lower end buried in the ground set back sufficiently from the berm so as not to damage the basin liner.

Figure 5:
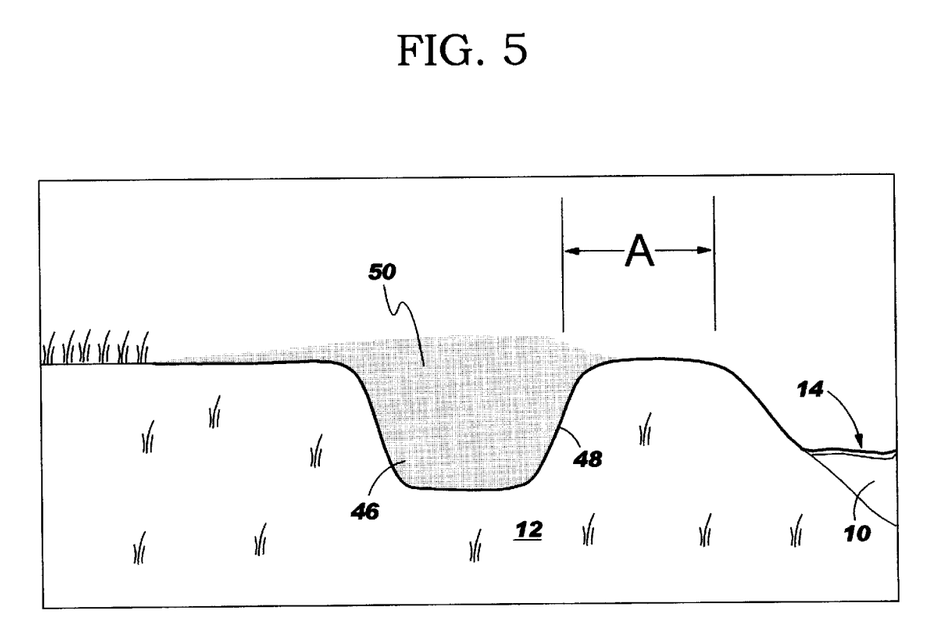
FIG. 5 is a side view of a modification of the invention at a later stage of deployment.

FIG. 5 shows an alternate form of tethering in high wind prone geography. A wide margin of the cover is placed in a trench with a vertical side wall that is prepared around the perimeter of the basin above the operational high water line, typically a distance indicated as "A" in FIG. 5 of about two and one-half feet from the edge. The trench is back filled with fill material 50 after the margin of the cover has been placed in the open trench. The margin of the cover is buried at a depth sufficient to withstand weather related stress.

Once in place, the cover suppresses the release of malodorous gases in several ways: First, the cover fabric is porous and it restricts the release of gas to a volume regulated by this porosity. Second, vapor pressure under the cover causes small areas of the cover to inflate and rise from the surface of the organic slurry in a low profile manner. Under observation, the cover appears to develop sand dune-like ripples. These elevated areas create a humid, aerobic environment along the unsubmerged surface of the cover. The presence of oxygen enables endemic facultative and/or aerobic bacteria to exist and break down malodorous gases passing through the cover to the atmosphere. Of particular note is significant nitrification/denitrification stimulated in this environment. Third, the anaerobic zone on the underside of the cover provides a substrate to which anaerobic bacteria attach and break down malodorous gases passing through the cover to the atmosphere. Fourth, the thin layer of geotextile material forms a barrier to mass transfer of gas, especially air-phase limited gases, based on two-film theory. This provides especially effective reduction in the transfer of short chain carbon ring volatile organic compounds through the cover to the atmosphere. Reduced disruption of the equilibrium of water-phase limited gases improves the retention time and subsequently improves reduction and release of these gases. The result is effective odor control.

The physical barrier of the cover plays an important metering function. Large volumes of malodorous gases are normally stripped from open structures due to agitation caused by wind, wave action or pummeling rainfall. The basin cover prevents stripping of gases and the porosity of the fabric helps to meter malodorous gas through the biofilm environment ubiquitous in and under the cover.

The cover can remain in place year around once in position and does not require regular inspection or maintenance. The geotextile fabric has superior elongation properties that allow it to accommodate freeze-thaw without damage. If the storage structure is emptied periodically, the cover may be loosened and pulled back during agitation and pump-out of stored organic slurry, then returned to the proper position.

Figure 6:
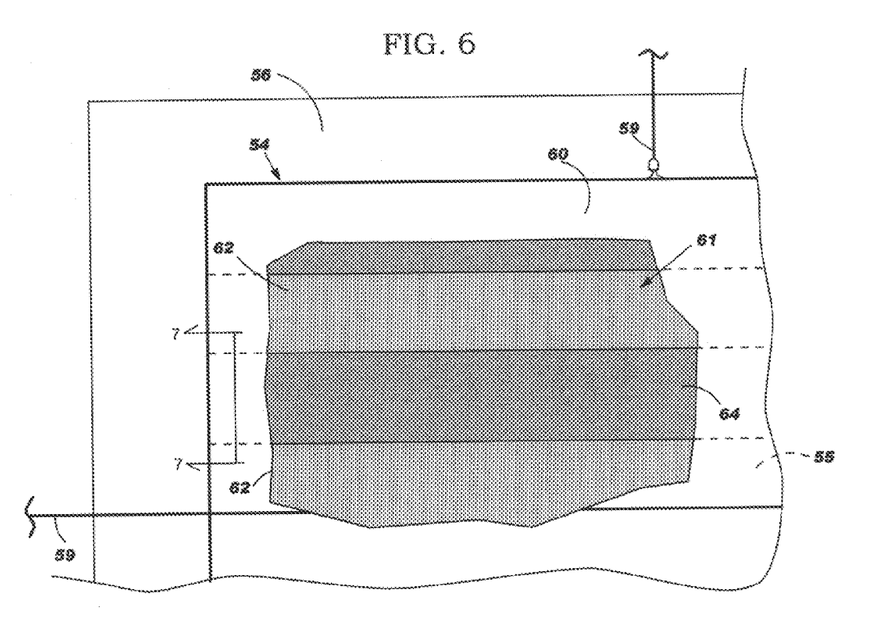
FIG. 6 is a top plan view showing a portion of a lagoon cover system according to a second embodiment of the invention installed on an organic slurry storage basin with portions broken away for purposes of illustration.
Figure 7:
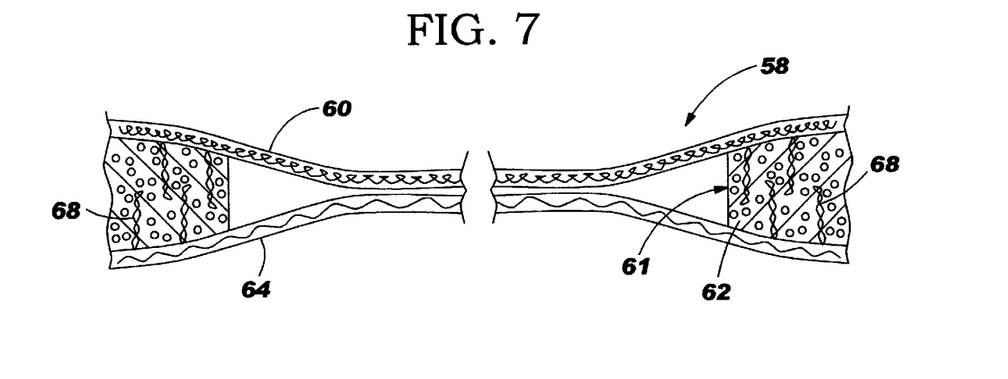
FIG. 7 is an enlarged sectional view of a portion of the cover of FIG. 6 taken along the line 7—7 thereof.
Figure 8:
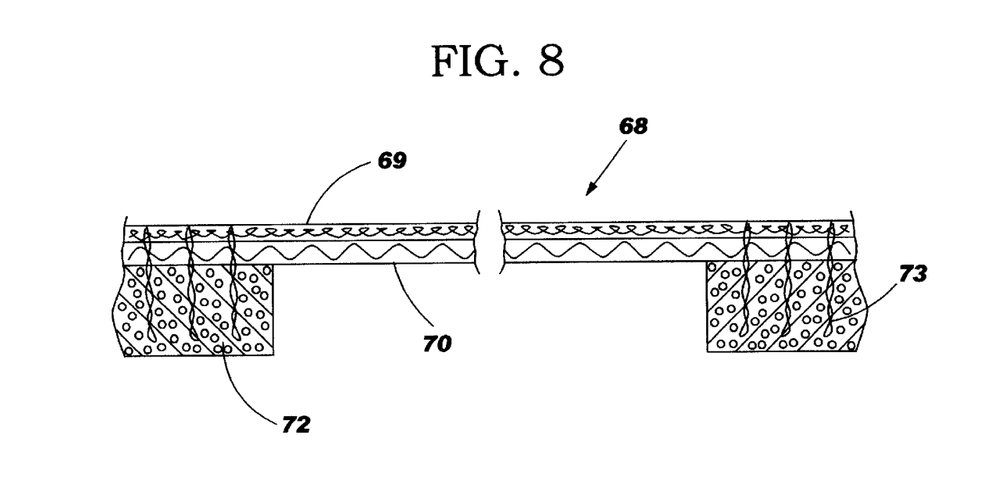
FIG. 8 is an enlarged sectional view like that of FIG. 7 showing a modification of the cover of FIG. 7.

FIGS. 6 through 8 show a further embodiment of a basin cover according to the invention. Ultraviolet light degradation is a major limitation on the useful life of a basin cover including a basin cover constructed of a geotextile fabric as described above. In addition, while the geotextile fabric cover floats on the material contained in the basin, eventually the flotation may be compromised by sedimentation, struvite crystallization on the underside of the cover, reduced gas pressure, or any combination of these factors. The embodiment of the invention shown in FIGS. 6 through 8 addresses these factors.

FIG. 6 is a view similar to that of FIG. 4 but showing only a corner view of a cover system having a cover indicated generally at 54 covering a lagoon basin 55 at least partially surrounded by a berm 56. Cover 54 is held in position by tether lines 59 as previously described.

Cover 54 is comprised of several strata including first, second and third layers. As shown in FIGS. 6 and 7, cover 54 includes a first or top layer 60. Top layer 60 is a sacrificial layer that is exposed to the ultraviolet light from the sun and protects the layers beneath it from ultraviolet light degradation. Top layer 60 can be a porous material such as a geotextile material.

In the embodiment shown in FIGS. 6 and 7, a second layer or intermediate stratum is comprised as a flotation foam layer 61. Foam layer 61 can be formed of parallel, spaced apart foam strips 62. Strips 62 are constructed of a closed or open cell foam and impart a significant amount of floatation to the cover. As one example of the distribution of the foam strips, the strips can be 18 inches in width and spaced apart from one another by a distance of 24 inches.

The third stratum or layer is a layer 64 of non-woven polypropylene fabric or geotextile fabric as previously described. The third stratum interfaces with the foam layer 61 and interfaces with the sacrificial layer 60 at the spaces between foam strips 62. The three stratum are connected by suitable means. In the example shown, the stratum are connected by a needle punching procedure. Needle punching intertwines fibers of the sacrificial stratum and the geotextile stratum to connect them. FIG. 7 shows intertwined fiber strands 68 connecting the various stratum.

The sacrificial layer 60 significantly extends the useful life of the cover 54. It does this by intercepting or blocking the destructive ultra violet light waves that would otherwise impinge upon the surface of the geotextile layer. Flotation provided by the floatation layer will decrease maintenance procedures on the cover.

A modification of the cover of FIGS. 6 and 7 is shown in FIG. 8. The cover indicated at 68 in FIG. 8 differs from that shown in FIGS. 6 and 7 through interchanging of positions of the foam layer and geotextile layer. The cover 68 has a top layer or sacrificial stratum 69. A second stratum is comprised as a layer of non-woven polypropylene fabric or geotextile material. A third stratum is a foam layer consisting of an array of foam strips arranged in parallel spaced-apart relationship. The stratum are connected by intertwined fabric fibers indicated at 73 resulting from a needle punching procedure. The foam layer provides flotation to the cover. The sacrificial stratum 69 significantly increases the life of the cover.

Cover 54 can be fabricated on-site as earlier described. The panels are laid out in fanfold fashion, with the sacrificial layers of adjacent panels alternately facing toward and away from the sacrificial layer of the next panel to assure that the sacrificial layers will be on top when the cover is deployed over the basin.

While certain embodiments of the invention have been shown and described, it will be apparent to those skilled in the art that deviations can be had from the embodiments shown without departing from the scope and spirit of the attached claims.

We claim:

1. A covered organic waste storage lagoon comprising:

an organic slurry basin bordered by an elongate berm along a first side of the basin and containing a quantity of organic slurry;

a cover fabricated of a plurality of cover sections of geotextile fabric laid out along the first side of the organic slurry basin in fanfold relationship parallel to the berm with adjacent edges of the panels interconnected on site at the basin, the cover having a leading edge on a last of said sections for moving across the basin in deployment of the cover over the lagoon;

a floatation device connected to the leading edge of the cover in order to pull the cover over the surface of organic slurry material located in the basin upon deployment of the cover;

a plurality of deployment lines connected at one end to the leading edge and extendable across the lagoon basin to a second side opposite the berm;

a mandrel assembly for temporary installation along a second side of the basin opposite the first side so that the deployment lines can be wound around the mandrel to pull the cover across the basin; and tether lines securable to edges of the cover for connecting the cover to anchors installed along the perimeter of the lagoon basin.

2. The organic waste storage lagoon of claim 1 wherein: the geotextile fabric has a grab tensile strength of at least 200 pounds.

3. The organic waste storage lagoon of claim 1 wherein: the geotextile fabric has an apparent size opening equal to a 100 U.S. sieve.

4. The organic waste storage lagoon of claim 1 wherein: the geotextile fabric has a permittivity of 1.5/gal./min./ft$^2$/sec. or less.

5. The organic waste storage lagoon of claim 1 wherein: said cover includes a plurality of strata including a first layer disposed on top of the cover when the cover is covering a lagoon basin and comprised as a sacrificial layer of material exposed to the ultraviolet rays of the sun;

second and third layers interconnected with the first layer and located beneath the first layer;

one of said second and third layers being a layer of geotextile fabric; and the other of said second and third layers being a floatation foam layer.

6. The organic waste storage lagoon of claim 5 wherein: the foam layer is comprised of a plurality of parallel spaced apart foam strips.

7. The organic waste storage lagoon of claim 6 wherein: said foam is a closed cell foam.

8. The organic waste storage lagoon of claim 5 wherein:

the foam layer is disposed between the first layer and the geotextile fabric layer.

9. The organic waste storage lagoon of claim 8 wherein:

said foam layer is comprised of a plurality of parallel spaced apart foam strips.

10. The organic waste storage lagoon of claim 8 wherein:

the first layer is also formed of geotextile fabric.

11. A cover system for installation to cover an organic slurry basin bordered by an elongate berm along a first side thereof, comprising:

a cover fabricated of a plurality of cover sections of geotextile fabric laid out along a first side of an organic slurry basin in fanfold relationship parallel to the berm and next to the lagoon with adjacent edges of the panels interconnected on site at the basin, the cover having a leading edge on the last of said sections for moving across the basin in deployment of the cover over the lagoon;

a floatation device connected to the leading edge of the cover in order to pull the cover over the surface of organic slurry material located in the basin upon deployment of the cover;

a plurality of deployment lines connected at one end to the leading edge and extendable across the lagoon basin to the side opposite the berm;

a mandrel assembly for temporary installation along a second side of the basin opposite the first side so that the deployment lines can be wound around the mandrel to pull the cover across the basin; and tether lines secured to edges of the cover for connecting the cover to anchors installed along the perimeter of the lagoon basin.

12. The cover system of claim 11 wherein:

the geotextile fabric has a grab tensile strength of at least 200 pounds.

13. The cover system of claim 11 wherein:

the geotextile fabric has an apparent size opening equal to a 100 U.S. sieve.

14. The cover system of claim 11 wherein:

the geotextile fabric has a permittivity of 1.5/gal./min./ft$^2$/sec. or less.

15. The cover assembly of claim 11 wherein:

said cover includes a plurality of strata including a first layer disposed on top of the cover when the cover is covering a lagoon basin and comprised as a sacrificial layer of material exposed to the ultraviolet rays of the sun;

second and third layers interconnected with the first layer and located beneath the first layer;

one of said second and third layers being a layer of geotextile fabric; and the other of said second and third layers being a floatation foam layer.

16. The cover assembly of claim 15 wherein:

the foam layer is comprised of a plurality of parallel spaced apart foam strips.

17. The cover assembly of claim 16 wherein:

said foam is a closed cell foam.

18. The cover assembly of claim 15 wherein:

the foam layer is disposed between the first layer and the geotextile fabric layer.

19. The cover assembly of claim 18 wherein:

said foam layer is comprised of a plurality of parallel spaced apart foam strips.

20. The cover assembly of claim 18 wherein:

the first layer is also formed of geotextile material.

21. A method of covering an organic waste storage lagoon basin containing a quantity of organic waste and having an elongate berm along a first side of the basin, comprising:

providing a plurality of panels of geotextile fabric in sufficient number to span the width of the basin to be covered;

successively laying out along the first edge of the basin parallel to the berm said panels of geotextile fabric in fanfold fashion;

overlapping edges of adjacent panels as they are laid out and fastening the adjacent panel edges together;

attaching a flotation device to the last edge of the top panel and attaching deployment lines to the flotation device;

extending the deployment lines to the opposite side of the basin;

providing a mandrel on the opposite side of the basin and winding the deployment lines on the mandrel to pull the cover across the basin as the flotation device floats on the surface of the organic waste located in the basin;

using tether lines to tether the cover in place at a plurality of tether points such that the cover floats atop the lagoon basin to substantially cover the lagoon basin.

22. A method of covering an organic waste storage lagoon basin containing a quantity of organic waste and having an elongate berm along a first side of the basin, comprising:

providing a plurality of panels of interconnected multiple strata material including a top sacrificial layer of material, a foam layer and a geotextile fabric layer, said panels in sufficient number to span the width of the basin to be covered;

successively laying out along the first edge of the basin parallel to the berm said panels of geotextile fabric in fanfold fashion in a manner such that the sacrificial layer will remain on top when the cover is deployed over the basin;

overlapping edges of adjacent panels as they are laid out and fastening the adjacent panel edges together; attaching a flotation device to the last edge of the top panel and attaching deployment lines to the flotation device;

extending the deployment lines to the opposite side of the basin;

providing a mandrel on the opposite side of the basin and winding the deployment lines on the mandrel to pull the cover across the basin as the flotation device floats on the surface of the organic waste located in the basin;

using tether lines to tether the cover in place at a plurality of tether points such that the cover floats atop the lagoon basin to substantially cover the lagoon basin.

23. The method of claim 22 including:

providing said foam layer as a plurality of parallel, spaced apart strips of foam.

* * * * *